United States Patent
Yano

(10) Patent No.: US 8,413,699 B2
(45) Date of Patent: Apr. 9, 2013

(54) RADIAL TIRE FOR AIRCRAFT

(75) Inventor: Takeshi Yano, Nerima-ku (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/600,136

(22) PCT Filed: Apr. 17, 2008

(86) PCT No.: PCT/JP2008/057504
§ 371 (c)(1), (2), (4) Date: Nov. 13, 2009

(87) PCT Pub. No.: WO2008/139827
PCT Pub. Date: Nov. 20, 2008

(65) Prior Publication Data
US 2010/0212802 A1    Aug. 26, 2010

(30) Foreign Application Priority Data
May 16, 2007    (JP) .................................. 2007-130630

(51) Int. Cl.
B60C 9/18    (2006.01)
B60C 9/22    (2006.01)

(52) U.S. Cl. .................. 152/527; 152/536; 152/531

(58) Field of Classification Search .................... 152/536
See application file for complete search history.

(56) References Cited

U.S. PATENT DOCUMENTS

| | | | |
|---|---|---|---|
| 2005/0126673 A1* | 6/2005 | Miyazaki et al. | 152/527 |
| 2005/0194081 A1* | 9/2005 | Yano et al. | 152/527 |
| 2007/0221307 A1 | 9/2007 | Yano et al. | |
| 2007/0221308 A1 | 9/2007 | Yano et al. | |

FOREIGN PATENT DOCUMENTS

| | | |
|---|---|---|
| EP | 0 403 045 A2 | 12/1990 |
| EP | 0 456 306 A1 | 11/1991 |
| EP | 1 186 448 A2 | 3/2002 |
| EP | 1 477 333 A1 | 11/2004 |

(Continued)

OTHER PUBLICATIONS

Saechtling: "Saechtling Kunststoff Taschenbuch Verlag Hanser" Nov. 10, 2004; URL:http://www.lkt.uni-erlangen.de/publikationen/buecher/Leseprobe_saecht-d.pdf.

(Continued)

Primary Examiner — Justin Fischer
Assistant Examiner — Philip N Schwartz
(74) Attorney, Agent, or Firm — Sughrue Mion, PLLC

(57) ABSTRACT

This invention provides a radial tire for aircraft comprising a belt composed of a plurality of belt layers, wherein a total strength of the belt $T_{belt}$ [N] in a circumferential direction over its full width satisfies $T_{belt}/WD \geq 1.5 \times 10^6$ in which D [m] is an outer diameter of the tire and W [m] is a width of the tire, the belt is composed of at least two belt layers each containing organic fiber cords with an elongation in an extension direction under a load of 3.2 cN/dtex of 2.2-9.3%, a protection belt layer having a circumferential stiffness lower than that of the belt is disposed at an outside of the belt in a radial direction, a ratio of the circumferential stiffness of the protection belt layer to the circumferential stiffness of the belt is less than 0.5, and the protection belt layer is composed of organic fiber cords having a tensile strength at break of not less than 6.3 cN/dtex and a heat shrinkage factor of 0.5-5.0%, whereby a durability of a tread portion can be improved without damaging an excellent durability against foreign matters.

5 Claims, 2 Drawing Sheets

FOREIGN PATENT DOCUMENTS

| | | |
|---|---|---|
| JP | 03-014702 A | 1/1991 |
| JP | 2004-306633 A | 11/2004 |
| JP | 2006-224951 A | 8/2006 |
| JP | 2007-182102 A | 7/2007 |
| JP | 2007-182103 A | 7/2007 |
| WO | 03/061991 A1 | 7/2003 |

OTHER PUBLICATIONS

Supplementary European Search Report issued Sep. 25, 2012 for corresponding European Application No. 08740574.2.

* cited by examiner (a)
corrugated shape (b)
two angular layers

RADIAL TIRE FOR AIRCRAFT

TECHNICAL FIELD

This invention relates to a radial tire for aircraft, and more particularly to a radial tire for aircraft capable of maintaining a tire durability against invasion of foreign matters and achieving an excellent high-speed durability of a tread portion.

BACKGROUND ART

In a radial tire for aircraft, an extremely-high specified internal pressure exceeding 10 atmospheric pressures is defined by an official standard, but also tire reinforcing members are required to have a pressure resistance corresponding to four times of the specified internal pressure. Further, exacting requirements for the safety of the tire are imposed, and hence it is required to provide a durability capable of running safely even if the tire treads foreign matters on an airstrip or a heavy load exceeding an usual use condition of tire is applied.

In order to meet these requirements, there is proposed a tire structure for preventing invasion of foreign matters into a tread portion of a tire at a state of inflating under a high internal pressure (WO 2003/061991). At this moment, it is possible to provide an excellent durability against the foreign matters by applying a high-strength and high-elastic modulus cord to a belt of a tire to suppress an extension of a tire tread in a circumferential direction in the filling of an internal pressure. However, when such a high-elastic modulus member is used in the belt cord, there are technical problems in tire manufacturing steps, particularly a vulcanization step of applying high temperature/high pressure to a green tire.

The vulcanization step of the tire is to promote a cross-linking reaction of rubber constituting the tire as well as to bond an interface between rubber members laminated in the tire building. In the tread portion of the tire, the adhesiveness of the rubber interface particularly plays an important role in the durability of the tread portion. In the tire vulcanization step, since a green tire is usually formed so as to be smaller as compared with a vulcanization mold, it is common that the green tire is somewhat enlarged by applying a high pressure to the green tire between a vulcanization bladder and the mold in the vulcanization. A ratio of a green tire enlarged during the vulcanization is referred to as a tire enlargement ratio, which is an important parameter in terms of manufacture. As requirements for ensuring the adhesion between rubber members are generally mentioned the following two points: (1) a sufficient vulcanizing pressure and (2) a rubber flow (at interface between members) during vulcanization. It is known that if these factors are lacking, the adhesion between rubber members is deteriorated. As to the rubber flow of the above item (2), there is the conventional knowledge that the larger the tire enlargement ratio and hence tire extension ratio during vulcanization, the larger the rubber flow.

Since the tire described in WO 2003/061991 uses a high-elastic modulus cord as compared with a previous radial tire for aircraft, if the enlargement ratio is made equal to that of the conventional tire, a part of pressure applied by the bladder during the vulcanization is born by the enlarged belt cord, and hence a pressure applied to the rubber interface in the tread portion is lowered and a desired adhesion is not obtained, so that it is necessary to set the enlargement ratio so as to be small. On the other hand, the rubber flow tends to be reduced by the lowering of the enlargement ratio. In order to establish these conflicting factors, a strict control of the enlargement ratio is demanded, which hinders the improvement of productivity. Even in terms of tire performances, such a control similarly becomes an obstruction in the attempt of further improving a high-speed durability of the tread.

Heretofore, as disclosed in Japanese Patent Application No. S63-307691, a protection belt layer of the tire is constituted by forming a high-tenacity organic fiber cord as typified by an aromatic polyamide (commonly known as an aramid fiber) into a corrugated shape and winding a great number of such cords in a circumferential direction, which plays a role for preventing the invasion of foreign matters. The conventional organic fiber cords do not cause the cord shrinkage in the heating or the change of cord length in the vulcanization of the tire, so that they have no effect of improving the vulcanizing pressure or rubber flow.

DISCLOSURE OF THE INVENTION

It is an object of the invention to solve such problems of the conventional techniques and to provide a radial tire for aircraft capable of improving the adhesion of the rubber interface, i.e., the durability of the tread portion without damaging the excellent durability against foreign matters.

In order to solve the above-mentioned problems, the invention provides a radial tire for aircraft comprising a radial carcass toroidally extending between a pair of bead cores and comprised of at least one carcass ply, and a belt disposed on an outer periphery of a crown region of the radial carcass and composed of plural belt layers each containing organic fiber cords, characterized in that a total strength of the belt $T_{belt}$ [N] in a circumferential direction over its full width satisfies $T_{belt}/WD \geq 1.5 \times 10^6$ in which D [m] is an outer diameter of the tire and W [m] is a width of the tire;

the belt is composed of at least two belt layers each containing organic fiber cords with an elongation in an extension direction under a load of 3.2 cN/dtex of 2.2-9.3%;

a protection belt layer having a circumferential stiffness lower than that of the belt is disposed at an outside of the belt in a radial direction;

a ratio of the circumferential stiffness of the protection belt layer to the circumferential stiffness of the belt is less than 0.5; and the protection belt layer is composed of organic fiber cords having a tensile strength at break of not less than 6.3 cN/dtex and a heat shrinkage factor of 0.5-5.0%.

In the radial tire for aircraft according to the invention, the total strength $T_{belt}$ of the belt in the circumferential direction over the full width satisfies the specified relationship, and the high-modulus organic fiber cord is applied to the belt, and the circumferential stiffness of the protection belt layer is made sufficiently small as compared with the belt, and the circumferential stiffness ratio between the belt and the protection belt layer is within the specified range, and further the properties of the protection belt layer, i.e., tensile strength at break and heat shrinkage factor are made within certain ranges, whereby it is possible to improve the durability of the tread portion while maintaining the durability against invasion of foreign matters in the radial tire for aircraft.

BEST MODE FOR CARRYING OUT THE INVENTION

Figure 1:
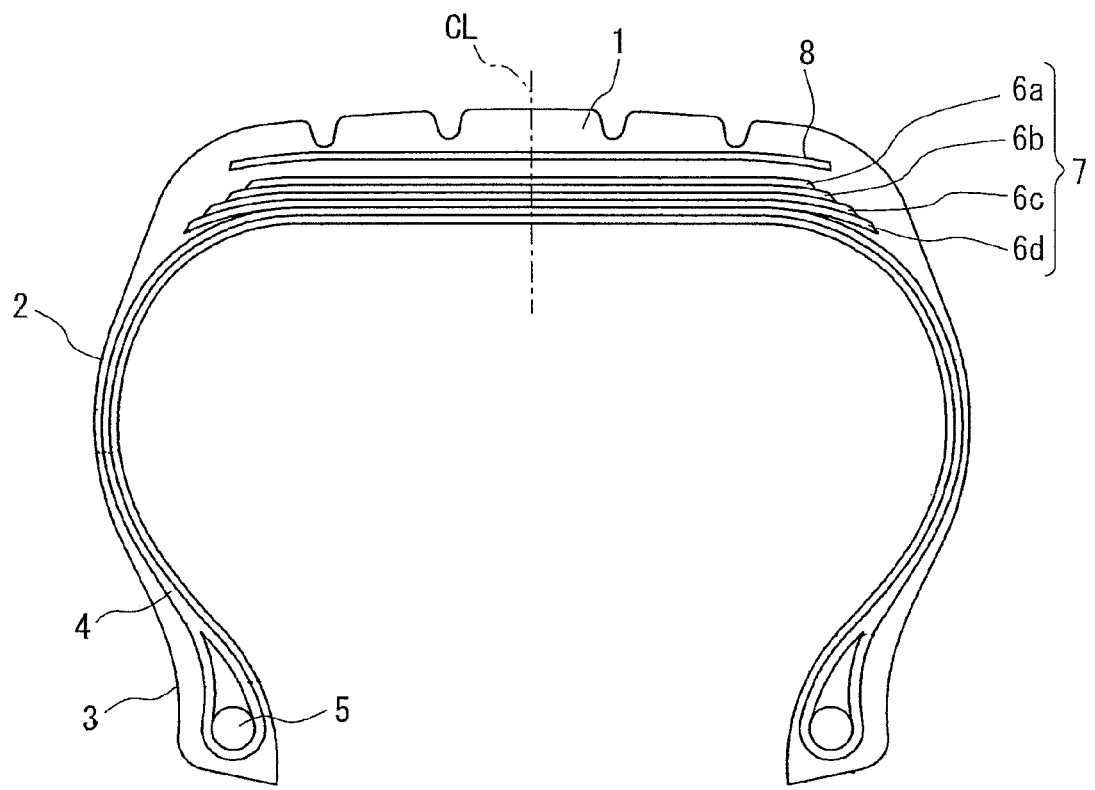
FIG. 1 is a schematically cross-sectional view of a radial tire for aircraft according to the invention.

The invention will be described in detail below with reference to the attached drawings. FIG. 1 is a schematically cross-sectional view of a radial tire for aircraft according to the invention. In FIG. 1, numeral 1 is a tread portion, and numeral 2 is a pair of sidewall portions each continuously extending inward from a side of the tread portion 1 in a radial direction, and numeral 3 is a bead portion continuously disposed at an inner circumference of each sidewall portion 2.

Also, a radial carcass 4 composed of at least one carcass ply toroidally extends between both the bead portions 3. The radial carcass 4 reinforcing these portions 1, 2, 3 is disposed by winding each side part around a ring-shaped bead core 5 embedded in the respective bead portion 3 from an inside toward an outside.

Figure 2:
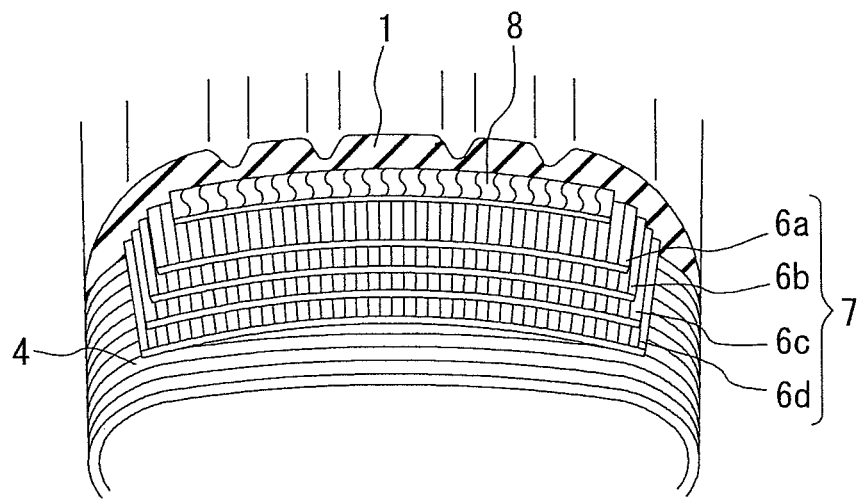
FIG. 2 is an exploded perspective view illustrating details of belt and protection belt layer structures in the radial tire for aircraft.

On an outer periphery of a crown region of such a radial carcass 4 is provided a belt 7 composed of plural belt layers 6, and further a protection belt layer 8 is disposed at an outside of the belt in a radial direction of the tire. An exploded perspective view showing details of the belt and protection belt layer structures in the radial tire for aircraft according to the invention is shown in FIG. 2.

In the invention, when D [m] is an outer diameter of the tire and W [m] is a width of the tire, a total strength $T_{belt}$ [N] of the belt in a circumferential direction over its full width is defined as $T_{belt}/WD \geq 1.5 \times 10^6$, whereby a high safety ratio required as a pressure resistance of a tire for aircraft can be accomplished. When T/WD is less than $1.5 \times 10^6$, it is difficult to satisfy the specified safety ratio.

The outer diameter of the tire and the width of the tire used herein mean a tire outer diameter and a tire width obtained by assembling a new tire onto a rim, filling a specified internal pressure settled in TRA to conduct stabilization for at least 12 hours and thereafter readjusting to the specified internal pressure.

The total strength used herein refers to the strength of the belt in the circumferential direction, and is a value calculated by multiplying a strength of one cord by the number of cords. Moreover, when the cord is slanted at an angle θ with respect to the circumferential direction, the total strength is calculated by multiplying the above strength by cos θ. The total strength of the belt in the circumferential direction over its full width is the sum of the cord strength for all cords constituting the belt.

In the embodiment shown in FIG. 1, the belt 7 is composed of four belt layers 6 (6a-6d), but the belt layers 6 constituting the belt 7 may be at least two. The belt is not limited to the embodiment of FIG. 1.

In at least two layers among the belt layers 6 constituting the belt 7 is used an organic fiber cord having such a high elastic modulus that an elongation in an extension direction under a load of 3.2 cN/dtex is 2.2-9.3%, whereby an excellent "hoop" effect in the crown portion of the tire can be obtained. This effect may effectively suppress the extension in the circumferential direction of the tread portion in the filling of a high internal pressure and ensure an excellent durability against invasion of foreign matters. Moreover, the term "an elongation in an extension direction under a load of 3.2 cN/dtex" used herein is a value measured according to JIS L1017.

In the invention, a protection belt layer 8 is provided at the outside of the belt 7 in a radial direction. The protection belt layer forms an excellent protector against foreign matters by applying a high-strength organic fiber cord having a tensile strength at break of not less than 6.3 cN/dtex. Also, the circumferential stiffness of the protection belt layer is set so as to be sufficiently smaller than that of the belt. Preferably, a ratio therebetween or a ratio of the circumferential stiffness of the protection belt layer to the circumferential stiffness of the belt is made to less than 0.5. Thereby, a large tension is not applied to the cord constituting the protection belt layer even in the radial growth of the tire by the filling of an internal pressure, and also an excellent cut resistance may be maintained in use. When the ratio of the circumferential stiffness between the protection belt layer and the belt is not less than 0.5, a large tension is applied to the cord constituting the protection belt layer by the filling of an internal pressure and the cut resistance of the cord is undesirably damaged. Moreover, the term "tensile strength at break" used herein is a value measured according to JIS L1017.

The circumferential stiffness of belt/protection belt layer used herein means a stiffness in a circumferential direction of the cord constituting the belt/protection belt layer, and is represented as a cord tension (cN/dtex) per unit size when a load giving an elongation of 2% is applied to one cord. When the cord is slanted at an angle θ with respect to an equatorial plane of the tire, the cord tension is multiplied by cos θ. When the cord inside the tire extends in a corrugated shape in the circumferential direction of the tire, a strength of the cord at a straight-extended state is not calculated, but a strength of the cord at a state embedded in the corrugated shape in the tire is calculated supposing it is extended in the circumferential direction.

Further, it is confirmed that when an organic fiber cord having a heat shrinkage factor of 0.5-5.0% is applied to the protection belt layer, a relative motion of rubber around the cord or rubber flow is excited in the heating during the vulcanization of the tire. Thus, it is found that the rubber flow between members required for improving the adhesion in the tread portion of the tire is obtained by the shrinking action of the members inside the tire during the vulcanization instead of the increase of the tire enlargement ratio. Thus, the improvement of the adhesion in the tread portion, i.e. the high-speed durability of the tread portion is achieved, but also a robust property against variation of production conditions may be improved. Moreover, the heat shrinkage factor used herein is an amount of cord shrunk after the cord is kept horizontally and left at 177° C. for 2 minutes at a state of applying a tension of 50 g, expressed by %.

It is preferable in the invention that a polyketone fiber cord is applied to the belt layer and/or protection belt layer in the radial tire for aircraft. The application of such a fiber cord may accomplish property values required for the cord constituting the protection belt layer, so that it is possible to produce a tire simultaneously establishing the excellent durability against foreign matters and tread durability.

As the polyketone fiber cord is used a fiber cord of a polyketone substantially having a repeating unit represented by the general formula (I):

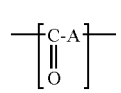

(wherein A is a moiety derived from an unsaturated compound polymerized with unsaturated bonds, and may be same or different in each of repeating units). Moreover, among the polyketones, a polyketone wherein not less than 97 mol % of the repeating unit is 1-oxotrimethylene [—CH$_2$—CH$_2$—CO—] is preferable, and a polyketone wherein not less than 99 mol % is 1-oxotrimethylene is more preferable, and a polyketone wherein 100 mol % is 1-oxotrimethylene is most preferable.

In the polyketone as the raw material of the polyketone fiber, ketone groups may be partly bonded with each other or moieties derived from the unsaturated compound may be bonded with each other, but it is preferable that the ratio of alternate arrangement of the moiety derived from the unsaturated compound and the ketone group is not less than 90% by mass, more preferably not less than 97% by mass, most preferably 100% by mass.

The unsaturated compound forming A in the formula (I) is most preferably ethylene, and may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl methacrylate, vinyl acetate, acrylamide, hydroxyethyl methacrylate, undecenoic acid, undecenol, 6-chlorohexene, N-vinylpyrolidone, diethylester of sulnylphosphonic acid, sodium styrenesulfonate, sodium allylsulfonate, vinylpyrolidone, vinyl chloride or the like; and so on.

As the polymerization degree of the polyketone, it is preferable that a limit viscosity (η) defined by the following formula:

$$[\eta] = \lim_{C \to 0} \frac{(T-t)}{(t \cdot C)}$$

(wherein t is a passing time of hexafluoroisopropanol having a purity of not less than 98% at 25° C. through a viscosity tube, and T is a passing time of a diluted solution of polyketone dissolved in the hexafluoroisopropanol at 25° C. through the viscosity tube; and C is a mass (g) of a solute in 100 mL of the diluted solution) is within a range of 1-20 dL/g, more preferably 2-10 dL/g, even more preferably 3-8 dL/g. When the limit viscosity is less than 1 dL/g, the molecular weight is too small and it is difficult to obtain a high-strength polyketone fiber cord, but also troubles such as napping, breaking and the like are frequently caused in the steps of spinning, drying and drawing. While, when the limit viscosity exceeds 20 dL/g, the synthesis of the polymer takes great time and cost, but also it is difficult to uniformly dissolve the polymer, which may badly affect the spinability and properties.

As a method for forming polyketone fiber are preferable (1) a method comprising the steps of spinning an undrawn fiber and subjecting to a multi-stage heat drawing in which a final drawing at the multi-stage heat drawing step is carried out at specified temperature and draft ratio, and (2) a method comprising the steps of spinning an undrawn fiber, subjecting to heat drawing and then quenching under a high tension. By forming the polyketone fiber through the method (1) or (2), desirable filaments suitable for the production of the polyketone fiber cord can be obtained.

The method for spinning the undrawn polyketone fiber is not particularly limited, but may adopt the conventionally well-known methods. Concretely, there are mentioned a wet spinning method using an organic solvent such as hexafluoroisopropanol, m-cresol or the like as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221. Among them, the wet spinning method using the aqueous solution of the salt is preferable.

For example, in the wet spinning method using the organic solvent, a polyketone polymer is dissolved in hexafluoroisopropanol, m-cresol or the like at a concentration of 0.25-20% by mass and extruded through a spinning nozzle to form a fiber and then the solvent is removed in a non-solvent bath of toluene, ethanol, isopropanol, n-hexane, isooctane, acetone, methyl ethyl ketone or the like, whereby the undrawn polyketone fiber can be obtained after the washing.

On the other hand, in the wet spinning method using the aqueous solution, the polyketone polymer is dissolved in an aqueous solution of zinc salt, calcium salt, thiocyanate, iron salt or the like at a concentration of 2-30% by mass and extruded through a spinning nozzle into a coagulation bath at 50-130° C. to conduct gel spinning and then desalted and dried to obtain the undrawn polyketone fiber. In the aqueous solution dissolving the polyketone polymer is preferably used a mixture of a zinc halide and a halide of an alkali metal or an alkaline earth metal. In the coagulation bath can be used water, an aqueous solution of a metal salt, or an organic solvent such as acetone, methanol or the like.

As the method for drawing the undrawn fiber is preferable a heat drawing method wherein the undrawn fiber is drawn by heating to a temperature higher than the glass transition temperature of the undrawn fiber. Moreover, the drawing of the undrawn fiber in the above method (2) may be carried out at one stage, but it is preferable to conduct the multi-stage drawing. The heat drawing method is not particularly limited, and may adopt a method of running the fiber on, for example, a heat roll or a heat plate, and so on. At this moment, the heat drawing temperature is preferably within a range of 110° C. to (a melting point of polyketone), and the total drawing ratio is preferably not less than 10 times.

When the formation of the polyketone fiber is carried out through the method (1), the temperature at the final drawing step of the multi-stage heat drawing is preferable to be within a range of 110° C. to (drawing temperature at drawing step just before the final drawing step −3° C.), and the drawing ratio at the final drawing step of the multi-stage heat drawing is preferable to be within a range of 1.01-1.5 times. On the other hand, when the formation of the polyketone fiber is carried out through the method (2), the tension applied to the fiber after the heat drawing is preferable to be within a range of 0.5-4 cN/dtex, and the cooling rate in the quenching is preferable to be not less than 30° C./second, and the cooling-end temperature in the quenching is preferable to be not more than 50° C. The quenching method of the heat-drawn polyketone fiber is not particularly limited, and may adopt the conventionally known methods. Concretely, the cooling method using the roll is preferable. Moreover, since the thus obtained polyketone fiber is large in the retention of elastic strain, it is preferable that the fiber is usually subjected to a relaxation heat treatment so as to make the fiber length shorter than the fiber length after the heat drawing. At this moment, the temperature of the relaxation heat treatment is preferable to be within a range of 50-100° C. and the relaxation ratio is preferable to be within a range of 0.980-0.999 times.

Figure 3:
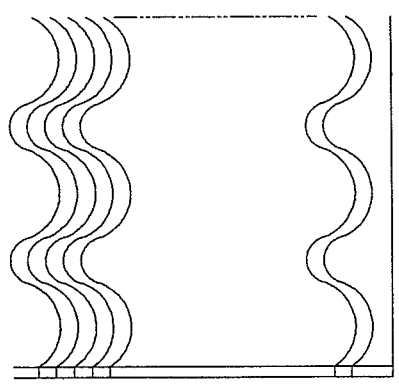
FIG. 3 is a view showing that a protection belt layer is (a) an embodiment composed of organic fiber cords preformed into a corrugated shape and (b) an embodiment composed of two slanted organic fiber cord layers.
Figure 3:
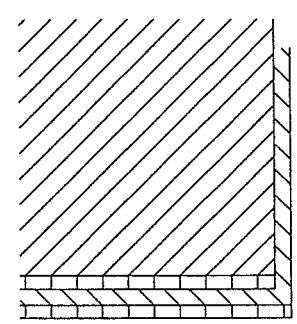

The protection belt layer according to the invention may take a structure capable of giving an excellent protector effect against invasion of foreign matters to the tread portion. In the protection belt layer of the invention, a great number of organic fiber cords preformed into a corrugated shape are swirled in the circumferential direction, whereby the application of tension to the cord constituting the protection belt layer is prevented even in the filling of a higher tire internal pressure, and it is possible to keep the protection effect of the tread portion without damaging a high cut resistance inherent to the cord. In FIG. 3(a) is shown an embodiment wherein the protection belt layer is composed of the organic fiber cord preformed into a corrugated shape.

Alternatively, the high protection effect can be similarly obtained by disposing a great number of organic fiber cords at an angle of 30-60° with respect to an equatorial plane of the tire. More preferably, the invasion of smaller foreign matters can be prevented more effectively by disposing a plurality of protection belt layers so as to cross the cords of these layers in left and right directions. When the angle of the organic fiber cord is less than 30°, tension is applied in the filling of an internal pressure to cause the deterioration of the cut resistance. While, when it exceeds 60°, a sufficient effect on cut resistance against the highest risky cutting in the widthwise direction of the tire may not be expected. In FIG. 3(b) is shown an embodiment wherein two protection belt layers each having the slanted organic fiber cords are disposed.

In order to further enhance the durability against the invasion of foreign matters into the tread portion, the density of the organic fiber cords constituting the protection layer in the widthwise direction of the tire is 3.0-10.0 cords per 10 mm of width. When the density is less than 3.0 cords/10 mm, the interval between cords becomes wider and it is difficult to defense invasion of small foreign matters. While, when the density exceeds 10.0 cords/10 mm, a rubber gauge between cords cannot be sufficiently ensured due to the congestion of the cords, which deteriorates the adhesion in this area.

EXAMPLES

The following examples are given in illustration of the invention and are not intended as limitations thereof.

In order to confirm the effect of the invention, there are provided one tire of Conventional Example, six tires of Examples according to the invention and two tires of Comparative Examples, and the cut resistance and high-speed durability thereof are measured. Moreover, the tire size is 46×17R20 30PR. The performance results evaluated on these tires are shown in Table 1. In Example 1 to Example 6, a polyketone fiber cord is used in a protection belt layer(s). In Example 1, Example 3 and Example 5, the protection belt layer is constituted by disposing the polyketone fiber cords preformed into a corrugated shape (FIG. 3a). In Example 2, Example 4 and Example 6, two protection belt layers are constituted by disposing the slanted polyketone fiber cords (FIG. 3b). In Table 1, an angle [°] means an angle with respect to an equatorial plane of the tire.

TABLE 1

| | | Tire size 46 × 17R20 30PR | | | | |
|---|---|---|---|---|---|---|
| | | Conventional Example | Example 1 | Example 2 | Example 3 | Comparative Example 1 |
| Belt layer | Kind of cord | aramid | aramid | aramid | polyketone | aramid |
| | Cord size | 3340 dtex/3 | 3340 dtex/3 | 3340 dtex/3 | 3340 dtex/3 | 3340 dtex/3 |
| | Structure | belt spirally-wound in a circumferential direction | belt spirally-wound in a circumferential direction | belt spirally-wound in a circumferential direction | belt spirally-wound in a circumferential direction | belt spirally-wound in a circumferential direction |
| | Total strength in a circumferential direction over full width of belt $T_{belt}$ (N) | $1.40 \times 10^6$ | $1.40 \times 10^6$ | $1.40 \times 10^6$ | $1.21 \times 10^6$ | $1.40 \times 10^6$ |
| | Outer diameter of tire D (m) | 1.17 | 1.17 | 1.17 | 1.17 | 1.17 |
| | Width of tire W (m) | 0.43 | 0.43 | 0.43 | 0.43 | 0.43 |
| | $T_{belt}/WD$ | $2.77 \times 10^6$ | $2.77 \times 10^6$ | $2.77 \times 10^6$ | $2.39 \times 10^6$ | $2.77 \times 10^6$ |
| | Elongation in an extension direction under a load of 3.2 cN/dtex (%) | 3.2 | 3.2 | 3.2 | 3.7 | 3.2 |
| | Angle (°) | ≈0° | ≈0° | ≈0° | ≈0° | ≈0° |
| | Number of layers | 4 | 4 | 4 | 4 | 4 |
| | Circumferential stiffness (A) (cN/dtex) | 2.6 | 2.6 | 2.6 | 1.8 | 2.6 |
| Protection belt layer | Kind of cord | aramid | polyketone | polyketone | polyketone | polyketone |
| | Cord size | 3340 dtex/3 | 3340 dtex/3 | 1670 dtex/2 | 3340 dtex/3 | 3340 dtex/3 |
| | Tensile strength at break (cN/dtex) | 15.2 | 13.0 | 13.0 | 13.0 | 13.0 |
| | Heat shrinkage factor of cord (%) | 0.3% | 1.8% | 1.8% | 1.8% | 1.8% |
| | Form | corrugated shape | corrugated shape | two angular layer | corrugated shape | circumferential direction |
| | Angle (°) | — | — | ±45° | — | 0° |
| | Cord density (cords/10 mm) | 3.5 | 3.5 | 5.0 | 3.5 | 3.5 |
| | Circumferential stiffness (B) (cN/dtex) | ≈0 | ≈0 | 1.27 | ≈0 | 1.8 |
| | Enlargement ratio in vulcanization (%) | 0.25% | 0.25% | 0.25% | 0.25% | 0.25% |
| | Ratio of circumferential stiffness (B/A) | ≈0 | ≈0 | 0.49 | ≈0 | 0.69 |

TABLE 1-continued

Tire size 46 × 17R20 30PR

| Evaluation | Cut resistance | 100 | 102 | 101 | 101 | 92 |
|---|---|---|---|---|---|---|
| | High-speed durability | 100 | 118 | 107 | 122 | 102 |

| | | | Comparative Example 2 | Example 4 | Example 5 | Example 6 |
|---|---|---|---|---|---|---|
| Belt layer | Kind of cord | | aramid | aramid | aramid | aramid |
| | Cord size | | 3340 dtex/3 | 3340 dtex/3 | 3340 dtex/3 | 3340 dtex/3 |
| | Structure | | belt spirally-wound in a circumferential direction | belt spirally-wound in a circumferential direction | belt spirally-wound in a circumferential direction | belt spirally-wound in a circumferential direction |
| | Total strength in a circumferential direction over full width of belt $T_{belt}$ (N) | | $1.40 \times 10^6$ | $1.40 \times 10^6$ | $1.40 \times 10^6$ | $1.40 \times 10^6$ |
| | Outer diameter of tire D (m) | | 1.17 | 1.17 | 1.17 | 1.17 |
| | Width of tire W (m) | | 0.43 | 0.43 | 0.43 | 0.43 |
| | $T_{belt}$/WD | | $2.77 \times 10^6$ | $2.77 \times 10^6$ | $2.77 \times 10^6$ | $2.77 \times 10^6$ |
| | Elongation in an extension direction under a load of 3.2 cN/dtex (%) | | 3.2 | 3.2 | 3.2 | 3.2 |
| | Angle (°) | | ≈0° | ≈0° | ≈0° | ≈0° |
| | Number of layers | | 4 | 4 | 4 | 4 |
| | Circumferential stiffness (A) (cN/dtex) | | 2.6 | 2.6 | 2.6 | 2.6 |
| Protection belt layer | Kind of cord | | polyketone | polyketone | polyketone | polyketone |
| | Cord size | | 1670 dtex/2 | 1670 dtex/2 | 3340 dtex/3 | 1670 dtex/2 |
| | Tensile strength at break (cN/dtex) | | 13.0 | 13.0 | 13.0 | 13.0 |
| | Heat shrinkage factor of cord (%) | | 1.8% | 1.8% | 1.8% | 1.8% |
| | Form | | two angular layer | two angular layer | corrugated shape | two angular layer |
| | Angle (°) | | ±25° | ±65° | — | ±45° |
| | Cord density (cords/10 mm) | | 5.0 | 5.0 | 2.5 | 11.0 |
| | Circumferential stiffness (B) (cN/dtex) | | 1.63 | 0.76 | ≈0 | ≈0 |
| | Enlargement ratio in vulcanization (%) | | 0.25% | 0.25% | 0.25% | 0.25% |
| | Ratio of circumferential stiffness (B/A) | | 0.63 | 0.29 | ≈0 | ≈0 |
| Evaluation | Cut resistance | | 93 | 98 | 98 | 110 |
| | High-speed durability | | 83 | 111 | 119 | 101 |

The cut resistance in Table 1 is a value obtained by a test wherein a sharp cutter of 50 mm in width, 30 mm in height and 30° in cutting edge angle is pressed to a tire inflated under a specified internal pressure in a widthwise direction of the tire while gradually increasing a loading, and is represented by an index on the basis that the loading in the breakage of the protection belt layer in the tire of Conventional Example is 100. The larger the index value, the better the performance.

The high-speed durability in Table 1 is evaluated by repeatedly conducting a takeoff test on a drum tester at specified internal pressure and loading under officially specified conditions, and represented by an index on the basis that the testing number until the occurrence of trouble in the tire of Conventional Example is 100. The larger the index value, the larger the takeoff number until the occurrence of trouble of the tire and the better the high-speed durability. In the examples, the high-speed durability is evaluated by repeatedly conducting a takeoff test wherein a tire is accelerated at an internal pressure and loading specified in TRA and at a constant rate from a speed of 0 to a specified speed so that the running distance reaches 11,500 feet, and counting the testing number until the occurrence of trouble.

Moreover, the ratio of the circumferential stiffness of the protection belt layer to the circumferential stiffness of the belt in Comparative Examples 1-2 is not less than 0.5, and the angle of slanted cord in two protection belt layers of Comparative Example 2 and Example 4 is outside the specified range, and the cord density of the protection belt layer in Examples 5-6 is outside the specified range.

As seen from Table 1, the tires of Examples have the excellent performances on both of cut resistance and high-speed durability, and particularly the high-speed durability thereof is more excellent than that of the tire of Conventional Example. On the other hand, the tires of Comparative Examples are not superior in both of cut resistance and high-speed durability to the tire of Conventional Example different from the tires of Examples.

In the radial tire for aircraft, the total strength $T_{belt}$ of the belt in the circumferential direction over the full width satisfies the specified relationship, and the high-modulus organic fiber cord is applied to the belt, and the circumferential stiffness of the protection belt layer is made sufficiently small as compared with the belt, and the circumferential stiffness ratio between the belt and the protection belt layer is within the specified range, and further the properties of the protection belt layer, i.e., tensile strength at break and heat shrinkage factor are made within certain ranges, whereby it is possible to improve the durability of the tread portion while maintaining the durability against invasion of foreign matters in the radial tire for aircraft. The tire according to the invention has such excellent properties and is useful as a radial tire for aircraft.

The invention claimed is:

1. A radial tire for aircraft comprising a radial carcass toroidally extending between a pair of bead cores and comprised of at least one carcass ply, and a belt disposed on an outer periphery of a crown region of the radial carcass and composed of plural belt layers each containing organic fiber cords, characterized in that a total strength of the belt $T_{belt}$ [N] in a circumferential direction over its full width satisfies $T_{belt}/WD \geq 1.5 \times 10^6$ in which D [m] is an outer diameter of the tire and W [m] is a width of the tire;

the belt is composed of at least two belt layers each containing organic fiber cords with an elongation in an extension direction under a load of 3.2 cN/dtex of 2.2-9.3%;

a protection belt layer having a circumferential stiffness lower than that of the belt is disposed at an outside of the belt in a radial direction;

a ratio of the circumferential stiffness of the protection belt layer to the circumferential stiffness of the belt is less than 0.5;

the protection belt layer is composed of organic fiber cords having a tensile strength at break of not less than 6.3 cN/dtex and a heat shrinkage factor of 0.5-5.0%; and the protection belt layer is composed of at least one layer and constituted by disposing a great number of organic fiber cords at an angle of 30-60° with respect to an equatorial plane of the tire.

2. A radial tire for aircraft according to claim 1, wherein the organic fiber cord constituting the protection belt layer is a polyketone fiber cord.

3. A radial tire for aircraft according to claim 2, wherein the polyketone fiber is a polyketone fiber consisting substantially of a repeating unit represented by the following general formula (I):

(wherein A is a moiety derived from an unsaturated compound polymerized with unsaturated bonds, and may be same or different in each of repeating units).

4. A radial tire for aircraft according to claim 3, wherein A in the formula (I) is ethylene.

5. A radial tire for aircraft according to claim 1, wherein a density of the organic fiber cords constituting the protection belt layer is 3.0-10.0 cords/10 mm in a widthwise direction of the tire.

* * * * *